United States Patent [19]

Baumann et al.

[11] Patent Number: 4,867,952

[45] Date of Patent: Sep. 19, 1989

[54] CRACKING TRAPS FOR PROCESS GAS COMPONENTS HAVING A CONDENSED PHASE

[75] Inventors: John A. Baumann, Ossining; Rozalie Schachter, Flushing; Marcello Viscogliosi, Croton, all of N.Y.

[73] Assignee: American Cyanamid Company, Stamford, Conn.

[21] Appl. No.: 196,433

[22] Filed: May 20, 1988

Related U.S. Application Data

[60] Continuation-in-part of Ser. No. 886,567, Jul. 16, 1986, Pat. No. 4,746,500, which is a division of Ser. No. 581,101, Feb. 17, 1984, Pat. No. 4,613,485.

[51] Int. Cl.⁴ .......................... B01J 8/00; F01N 3/10
[52] U.S. Cl. .................................. 423/210; 423/245.1; 422/173; 422/186.29; 118/723
[58] Field of Search ............... 422/173, 906, 186.29, 422/187, 244; 423/210, 245.1; 118/715, 723

[56] References Cited

U.S. PATENT DOCUMENTS

| | | |
|---|---|---|
| 3,024,009 | 3/1962 | Booth, Jr. et al. .................. 422/244 |
| 3,625,846 | 12/1971 | Murdoch et al. .......... 422/186.29 X |
| 3,862,043 | 1/1975 | Haakenson ..................... 422/186.29 |
| 4,613,485 | 9/1986 | Parry et al. ..................... 422/187 X |
| 4,746,500 | 5/1988 | Parry et al. ......................... 423/322 |

OTHER PUBLICATIONS

Process Technology Limited, "PTL's Post Reaction Chamber (PRC) for Reactive Trapping of Toxic Process Effluents", no known publication date, pp. 1–18 Oromocto, New Brunswick, Canada.

Primary Examiner—Barry S. Richman
Assistant Examiner—Rebekah A. Griffith
Attorney, Agent, or Firm—F. Eugene Davis, IV

[57] ABSTRACT

Effluent process gases, particularly those employed in the production and processing of solid state electronic components, are cracked to form products having a condensed phase, which may be separated from the flowing process gas. A plasma trap comprises a high frequency coil for producing a plasma therein. The walls of the trap may be cooled and the trap may employ a removable wall on which the cracked product collects. Particular gases that may be treated are arsine, phosphine, disilane, silane, germane, organometallics and gases containing beryllium and boron.

17 Claims, 1 Drawing Sheet

CRACKING TRAPS FOR PROCESS GAS COMPONENTS HAVING A CONDENSED PHASE

RELATED APPLICATIONS

This application is related to the U.S. Patent Application of Robert W. Parry, John A. Baumann, and Rozalie Schachter, entitled PNICTIDE TRAP FOR VACUUM SYSTEMS, filed July 16, 1986, Ser. No. 886,567, which was a divisional of U.S. Application Ser. No. 581,101, filed Feb. 17, 1984, issued as U.S. Pat. No. 4,613,485, Sept. 23, 1986. This application is a continuation-in-part of Ser. No. 886,567, issued as U.S. Pat. No. 4,746,500 and said application and said patent are incorporated herein by reference.

TECHNICAL FIELD

This invention relates to cracking traps for process gas components having a condensed phase.

BACKGROUND ART

In the manufacture of solid state electronic components and in other processes, excess process gases having deleterious components must be treated to prevent the deleterious components from contaminating the environment. Gases such as arsine, phosphine, disilane, silane, germane, various organometallics and gases having beryllium and boron component, all have engender disposal problems in industry.

DISCLOSURE OF THE INVENTION

According to the invention excess process gases are passed through a trap containing a cracker for the gases, which crack the gases into one or more components which have a condensed phase and thus will condense on the walls of the cracker, or precipitate out within the cracker. Preferably we use a plasma cracker, but other crackers such as a heated filament can be employed.

OBJECTS OF THE INVENTION

It is therefore an object of the invention to remove deleterious components from process gas effluents.

Another object of the invention is to provide a cracking trap for process gas effluents.

Other objects of the invention will in part be obvious and will in part appear hereinafter.

The invention accordingly comprises the several steps and the relation of one or more such steps with respect to each of the others, and the apparatus embodying features of construction, selection of elements and arrangements of parts which are adapted to effect such steps, all as exemplified in the following detailed disclosure. The scope of the invention is indicated in the claims.

BRIEF DESCRIPTION OF THE DRAWINGS

For a fuller understanding of the nature and objects of the invention, reference should be made to the following detailed description taken in connection with the accompanying drawings in which.

The same reference characters refer to the same elements throughout the several views of the drawings.

BEST MODE FOR CARRYING OUT THE INVENTION

Figure 1:
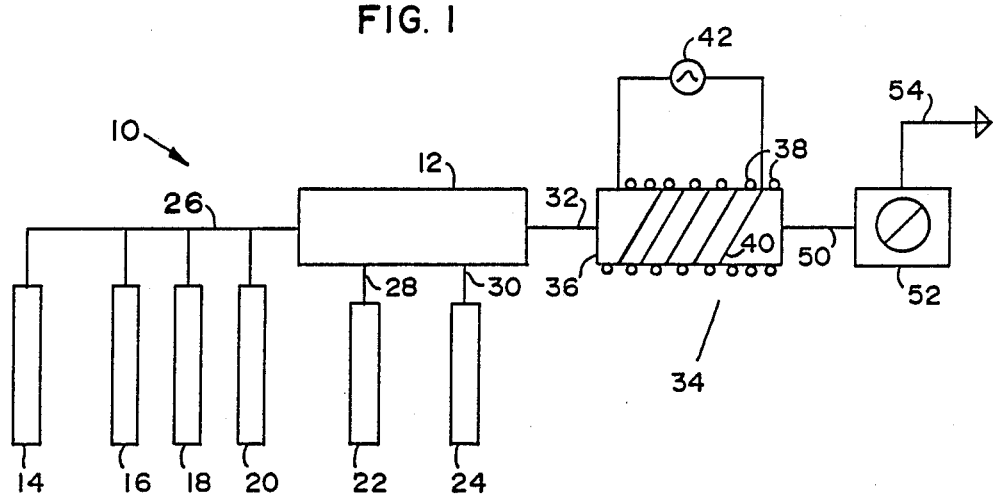
FIG. 1 is a diagram of a process system employing the trap of the invention.

Now referring to FIG. 1, a process such as chemical vapor deposition in the production of solid state electronic components is generally shown at 10. It comprises a reaction or deposition chamber 12, to which are supplied one or more gases from gas cylinders 14, 16, 18, 20, 22, and 24. Some gases may be mixed before being supplied to the reaction chamber 12 along a mixing line 26. Other gases may be supplied to the reaction chamber 12 in separate supply lines, such as at 28 and 30. The effluent gases from the reaction chamber 12 are supplied via line 32 to the plasma cracker generally indicated at 34, where the effluent gas is cracked and one or more deleterious components having a condensed phase are precipitated out. To this end the cracker 34 comprises a non-conductive walled vessel 36 which may be cooled by cooling coils 38. A high frequency exciter coil 40 is connected to a high frequency generator 42 for creating the plasma within cracker 34.

Figure 2:
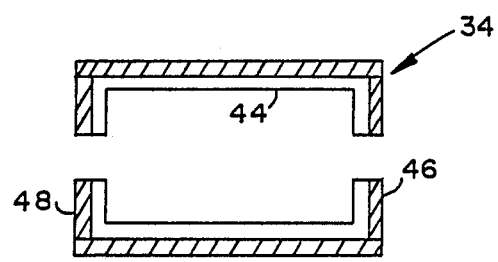
FIG. 2 is a diagrammatic cross section of the trap shown in FIG. 1.

Now referring to FIG. 2, the cracker 34 may be supplied with removable inner wall or walls 44 on which the condensed phase components collect. The inner walls 44 may be removed by first removing one of the end caps 46 or 48. The effluent gases within the cracker 36 may be caused to flow through a tortuous path by means of baffles (not shown) to aid in collecting the condensed phase precipitated out. The remaining gases exit the plasma chamber 34 via line 50, where they are supplied to the pump 52. Gases from the pump 52 may be supplied via line 54 to the atmosphere or to further effluent processing apparatus.

Cases in which the deleterious gases may be treated by the present system include pnictide gases such as arsine and phosphine, other poisonous gases such as silane, disilane, germane, organometallic gases, gases containing beryllium and boron, and so forth.

Preferably the cracker 34 comprises a cylindrical glass or ceramic tube and the radio frequency voltage from the generator 42 is applied to the cracker 34 by means of parallel or concentric capacitor plates surrounding the cracker. Concentric plates work best and it is desirable that the cracker tube be of pyrex since this will absorb the ultraviolet radiation emitted from the plasma. We have successfully removed the element arsenic from arsine gas utilizing RF frequencies as low as 400,000 Hertz and as high as 13.56 million Hertz.

Any suitable cracker or cracking method may be employed, such as a heated filament. However, plasma cracking is preferred. The particular cracker disclosed in U.S. Pat. No. 4,613,485 may be employed, with the hot filament disclosed therein.

It will thus be seen that the objects set forth above among those made apparent by the preceding description, are efficiently attained and since certain changes may be made in the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letter Patent is:

1. A trap for components of a multicomponent process gas effluent comprising a gas chosen from the group consisting of hydrides of elements and organometallic gases comprising a chamber to which the process gas effluent is supplied and cracking means within said chamber for cracking the process gas to components, at least one of which forms a condensed phase in said chamber, wherein said cracking means is generated by a radio frequency plasma generating means capacitively coupled to said chamber.

2. The trap defined in claim 1 and means for cooling the walls of said chamber.

3. A trap as defined in claim 1 and a processing chamber for the manufacture of solid state electronic components producing said process gas effluent.

4. A trap as defined in claim 3 wherein said processing chamber comprises apparatus for chemical vapor deposition.

5. A trap as defined in claim 1 wherein said chamber comprises a cylinder of vitreous material and said potential is coupled to said chamber by a pair of capacitor plates concentric with said cylinder.

6. A method of trapping a component having a condensed phase of a process gas effluent comprising a gas chosen from the group consisting of hydrides of elements and organometallic gases comprising cracking the process gas to form said component.

7. The method of claim 6 wherein said component is an element.

8. The method as defined in claim 6 wherein said process gas effluent eminates from a processing chamber for the manufacture of solid state electronic components.

9. The method as defined in claim 8 wherein said gas effluent eminates from a chamber for chemical vapor deposition.

10. The method as defined in claim 8 wherein said component is condensed on a cooled surface.

11. The method defined in claim 6 and collecting said component in a container in which said cracking occurs.

12. A method of trapping a component having a condensed phase of a process gas effluent comprising a gas chosen from the group consisting of hydrides of elements and organometallic gases comprising passing the process gas through a plasma to form said component.

13. The method of claim 12 wherein said component is an element.

14. The method as defined in claim 12 wherein said process gas effluent eminates from a processing chamber for the manufacture of solid state electronic components.

15. The method as defined in claim 14 wherein said gas effluent eminates from a chamber for chemical vapor deposition.

16. The method as defined in claim 15 wherein said component is condensed on a cooled surface.

17. The method defined in claim 12 and collecting said component in a container in which said plasma forms.

* * * * *